US007100328B2

(12) United States Patent
Scheer et al.

(10) Patent No.: US 7,100,328 B2
(45) Date of Patent: Sep. 5, 2006

(54) ARTICULATING WINDOW PANEL WITH HIDDEN HINGE FOR VEHICLES

(75) Inventors: Del Wayne Scheer, Oxford, MI (US); Jeff Scott Wilkinson, South Lyon, MI (US)

(73) Assignee: Dura Global Technologies, Inc., Rochester Hills, MI (US)

( * ) Notice: Subject to any disclaimer, the term of this patent is extended or adjusted under 35 U.S.C. 154(b) by 348 days.

(21) Appl. No.: 10/793,699

(22) Filed: Mar. 4, 2004

(65) Prior Publication Data

US 2005/0193634 A1 Sep. 8, 2005

(51) Int. Cl.
*E05D 7/00* (2006.01)
*E05D 11/08* (2006.01)
*B60J 1/14* (2006.01)

(52) U.S. Cl. ..................... 49/398; 49/397; 296/146.16; 16/341; 16/367

(58) Field of Classification Search .................. 49/324, 49/381, 394, 397, 398, 400; 296/146.16, 296/201, 216.02; 16/367, 341, 221, 250, 16/297, 374, DIG. 43, DIG. 13, 386, 385, 16/382; 52/208, 204.62, 204.69
See application file for complete search history.

(56) References Cited

U.S. PATENT DOCUMENTS 1,699,839 A * 1/1929 Gohmann .................... 164/388
4,396,221 A 8/1983 Morgan et al.
4,511,129 A 4/1985 Kishino
4,630,332 A * 12/1986 Bisbing ....................... 16/273
4,777,699 A 10/1988 Hill et al.
5,060,440 A 10/1991 Weaver
5,551,197 A 9/1996 Repp et al.
5,704,173 A * 1/1998 Repp et al. .............. 52/204.62
5,966,874 A * 10/1999 Repp et al. ................... 49/398
6,032,990 A 3/2000 Stone et al.
6,123,383 A 9/2000 Doerflinger et al.
6,128,860 A 10/2000 Repp et al.
6,658,672 B1 * 12/2003 Hsieh .......................... 16/221
6,845,546 B1 * 1/2005 Lu et al. ........................ 16/367
6,865,778 B1 * 3/2005 Pan et al. ...................... 16/342
6,871,450 B1 * 3/2005 Repp et al. ................... 49/398
6,915,545 B1 * 7/2005 Chen ........................... 16/297
2002/0069590 A1 6/2002 Repp et al.
2003/0088944 A1 5/2003 Gipson

FOREIGN PATENT DOCUMENTS

DE 3600477 A1 * 7/1987
EP 158831 A2 * 10/1985

* cited by examiner

*Primary Examiner*—Hugh B. Thompson, II
(74) *Attorney, Agent, or Firm*—Peter D. McDermott; Banner & Witcoff Ltd.; Dean B. Watson

(57) ABSTRACT

An articulating window assembly is adapted for use with a vehicle. The assembly includes a windowpane with an inner surface and a hinge adjacent to the inner surface. The hinge includes a stationary member having a pivot element with cylindrical extensions and a central portion of larger cross-sectional area than the cylindrical extensions. The hinge further includes a mounting element extending at an angle from the pivot element. A polymeric member surrounds at least a portion of the cylindrical extensions so as to permit the hinge member to articulate about the pivot axis. Optionally, the polymeric member defines a cavity adjacent the central portion on the compression side of the stationary member to provide clearance of the polymeric member when the window is opened.

22 Claims, 9 Drawing Sheets

ARTICULATING WINDOW PANEL WITH HIDDEN HINGE FOR VEHICLES

FIELD OF THE INVENTION

This invention relates generally to flush-mounted window assemblies for vehicles and more particularly, to flush-mounted vehicular window assemblies, which articulate about a hinge, attached to one side of the window.

BACKGROUND OF THE INVENTION

Articulated or hinged windows are conventionally fixed to a vehicle body by a mounting assembly that includes a stud passing through a hole drilled in the windowpane. A low profile nut is then threaded onto the stud extending through the windowpane. A major disadvantage is that a significant number of glass panes are broken as a result of drilling the holes through the pane. Panes are also broken during or after mounting the assembly to a vehicle. To avoid breakage of glass panes, sophisticated techniques have been adapted to drill the holes, and the mounting hardware has been adapted to reduce breakage. As a result, the price of such panel assemblies is high. Moreover, the resulting panel is not truly flush since the mounting hardware has a positive relief with respect to the panel exterior surface.

A disadvantage associated with certain known vehicular hinged windows is exposure of a hinge member fastener or cover piece on the exterior surface of the windowpane. The exterior profiles of these window assemblies are not truly flush.

Certain attempts to solve the above problems with a bonded hinge, such as U.S. Pat. No. 6,128,860, employ a bonded requiring a substantial offset between a first latch portion bonded to the windowpane and a second latch portion attached to the window opening frame. Thus, such designs have not been widely commercially adapted for thin window recess applications.

It is an object of the present invention to provide articulating window assemblies that reduce or wholly overcome some or all of the difficulties inherent in prior known devices. Particular objects and advantages of the invention will be apparent to those skilled in the art, that is, those who are knowledgeable or experienced in this field of technology, in view of the following disclosure of the invention and detailed description of certain preferred embodiments.

SUMMARY

In accordance with a first aspect, articulating window assemblies are provided that are adapted for use with a support structure, for example, in a window opening of a vehicle wall, e.g., a body panel, support column and the like. The articulating window assemblies comprise a windowpane having an inner surface, an outer surface and a peripheral edge. The inner surface of the windowpane has an attachment portion to which a hinge is mounted or attached. The hinge comprises a stationary member and a polymeric member. The stationary member has a pivot element that extends along a pivot axis, that is, the axis about which the window articulates, and a mounting element extending at an angle from the pivot element. It will be understood that the mounting element extends at an angle greater than zero; for example, the angle in certain embodiments would be substantially a right angle to the pivot axis, and typically perpendicular or substantially perpendicular to the plane of the windowpane when the window is in a closed position. Where the configuration of the support structure and/or windowpane so dictates, the mounting element can extend at an angle other than perpendicular to the windowpane when the window is in the closed position. The pivot element comprises a central portion, from which the mounting element extends, and a cylindrical extension extending along the pivot axis from the central portion. The central portion has a larger cross section, taken normal to the pivot axis, than the cylindrical extension. The polymeric member surrounds or encases at least a portion of the cylindrical extension and is attached to the attachment portion of the windowpane to retain the hinge to the windowpane. The polymeric member does not bond to the hinge, but instead surrounds the cylindrical extensions and retains the extensions mechanically such that the polymeric member, and thereby the windowpane, can pivot about the pivot axis along which the cylindrical extension lies.

In certain embodiments, the pivot element comprises two cylindrical extensions extending along the pivot axis from opposite sides of the central portion. The polymeric member in such embodiments optionally surrounds at least a portion of both cylindrical extensions to better retain the windowpane against the pivot element.

In accordance with a second aspect, articulating window assemblies are provided that are adapted to for use with a support structure, for example, in a window opening of a vehicle wall, e.g., a body panel, support column and the like. The articulating window assemblies comprise a windowpane having an inner surface, an outer surface and a peripheral edge. The inner surface of the windowpane has an attachment portion to which a hinge is mounted or attached. The hinge comprises a stationary member and a polymeric member. The stationary member has a pivot element that extends along a pivot axis, that is, the axis about which the window articulates, and a mounting element extending at an angle from the pivot element. It will be understood that the mounting element extends at an angle greater than zero; for example, the angle in certain embodiments would be substantially a right angle to the pivot axis, and typically perpendicular or substantially perpendicular to the plane of the windowpane when the window is in a closed position. Where the configuration of the support structure and/or windowpane so dictates, the mounting element can extend at an angle other than perpendicular to the windowpane when the window is in the closed position. The pivot element comprises a central portion, from which the mounting element extends, and a cylindrical extension extending along the pivot axis from the central portion. The polymeric member surrounds or encases at least a portion of the cylindrical extension and is attached to the attachment portion of the windowpane to retain the hinge to the windowpane. The polymeric member surrounds the cylindrical extensions and retains the extensions mechanically such that the polymeric member, and thereby the windowpane, can pivot about the pivot axis along which the cylindrical extension lies.

The hinge has a window opening side, that is, a side that is designed to face the window opening when the window assembly is installed in a window opening, and a second side opposite the window opening side. The polymeric member has a cavity, cut-out or rabbet at the second side of the stationary member, typically at the central portion of the stationary member. Such a configuration clears polymeric material that, when the windowpane is pivoted to an open position, might otherwise be compressed against or into the stationary member, the body panel or other support structure to which the window assembly was attached, or both.

In accordance with yet another aspect, vehicles are provided having one or more articulating window assemblies in accordance with any of the aspects or embodiments presented herein. In these embodiments, the hinge is attached or mounted, typically rigidly attached or mounted, to the vehicle, typically via the mounting element of the stationary member of the hinge. In this fashion, the windowpane is capable of articulating relative to the vehicle, for example, from a closed position to an open position. In certain embodiments the polymeric member is bonded to the inner surface of the windowpane such that the polymeric member does not contact the outer surface or the peripheral edges of the windowpane, improving the streamlining and outward appearance of the window assembly. In certain embodiments, the window assembly is flush-mounted, that is, is mounted so that the outer surface of the windowpane is flush with an outer surface of the vehicle with no part of the polymeric member or other mounting structure or material extending beyond a plane defined by the outer surface of the windowpane. This enables a smooth, streamlined appearance that is desirable in modern vehicles.

Without wishing to be bound by theory, it is currently understood that in at least certain embodiments of the window assemblies disclosed here, the stresses on the hinge are substantially reduced at the attachment area since the window rotates, pivots or articulates about a mechanical joint, thereby not requiring that a substantial portion of the pivoting stresses be accommodated by a single component. Further, in at least certain embodiments the cavity in the polymeric member on the second side of the central portion permits the window to be opened or articulated without the polymeric member to contact the body panel of the stationary member itself, thus reducing stresses the hinge components, the windowpane and the body panel and reducing the force required to open the window. Additionally, certain embodiments of the window assemblies provided herein are advantageous because a more compact hinged joint is possible, requiring less protrusion into the interior of the structure, for example, the vehicle, to which it may be mounted.

From the foregoing disclosure and the following more detailed description of various preferred embodiments, it will be apparent to those skilled in the art that the present invention provides a significant advance in the technology and art of articulated window assemblies. Additional features and advantages of various preferred embodiments will be better understood in view of the detailed description provided below.

Figure 1:
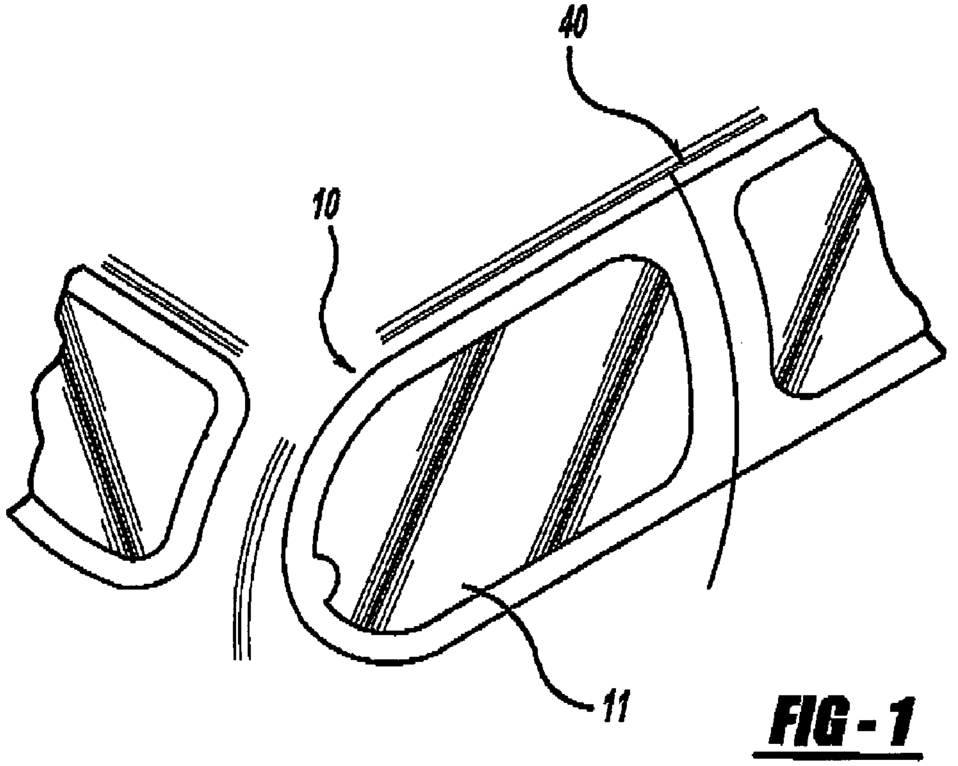
FIG. 1 is a perspective view of a flush-mounted articulated window assembly shown in assembly in a motor vehicle in accordance with a preferred embodiment.

It should be understood that the appended drawings are not necessarily to scale, presenting a somewhat simplified representation of various preferred features illustrative of the basic principles of the invention. The specific design features of an articulated window assembly as disclosed here, including, for example, specific dimensions of the hinge member and the latch mount, will be determined in part by the particular intended application and use environment. Certain features of the illustrated embodiments have been enlarged or distorted relative to others to facilitate visualization and clear understanding. In particular, thin features may be thickened, for example, for clarity of illustration. All references to direction and position, unless otherwise indicate, refer to the orientation of the articulated window assemblies illustrated in the drawings.

DETAILED DESCRIPTION OF CERTAIN EMBODIMENTS

It will be apparent to those skilled in the art, that is, to those who have knowledge or experience in this area of technology, that many uses and design variations are possible for the articulated window assemblies disclosed here. The following detailed discussion of various alternative and preferred features and embodiments will illustrate the general principles of the invention with reference to a flush mounted window assembly for use as a side window on a minivan type motor vehicle. Other embodiments suitable for other applications, such as three-sided flip windows and articulating windows for pickup trucks, sport utility vehicles, cross-over vehicles, or van conversions, will be apparent to those skilled in the art given the benefit of this disclosure.

Figure 2:
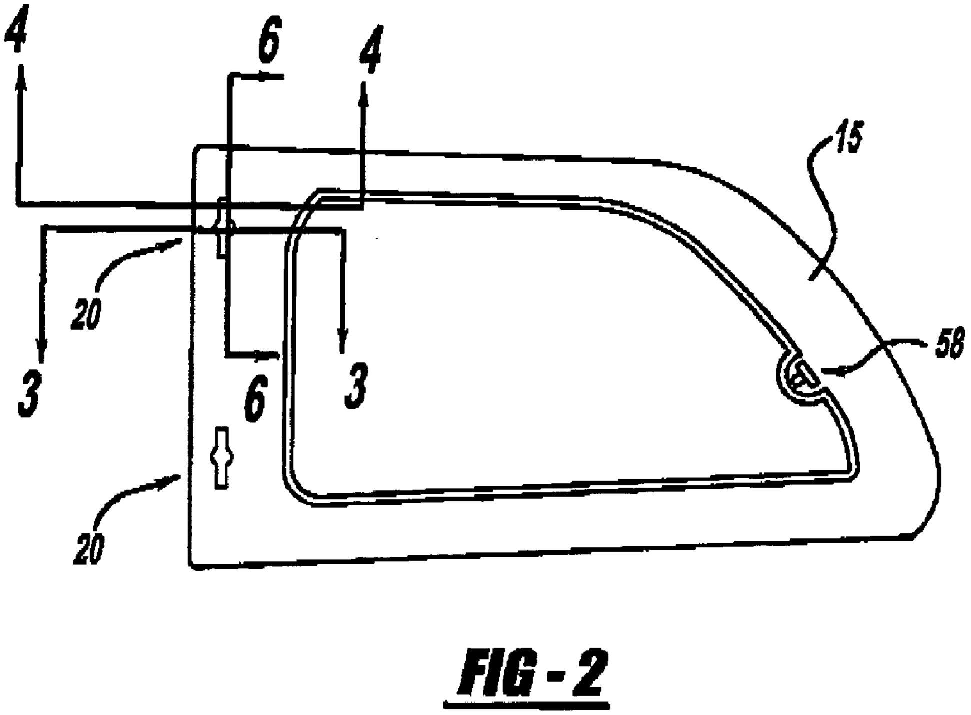
FIG. 2 is an elevation view of the inner surface of the window assembly of FIG. 1, showing an inner surface of the windowpane.
Figure 3:
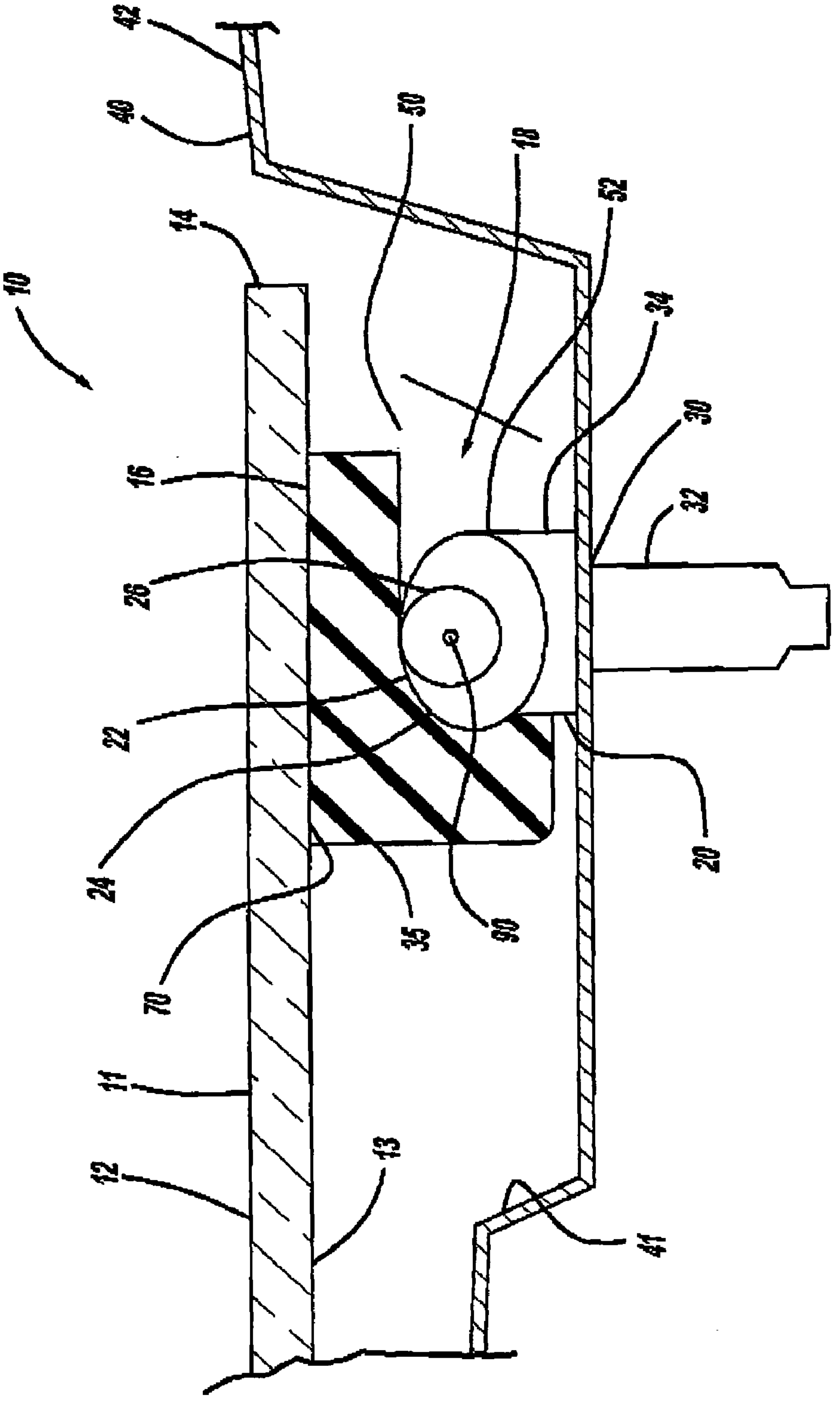
FIG. 3 is a partial cross-sectional view, partially broken away, of the window assembly of FIGS. 1–2, taken along line 3—3 in FIG. 2, shown in a closed position.
Figure 4:
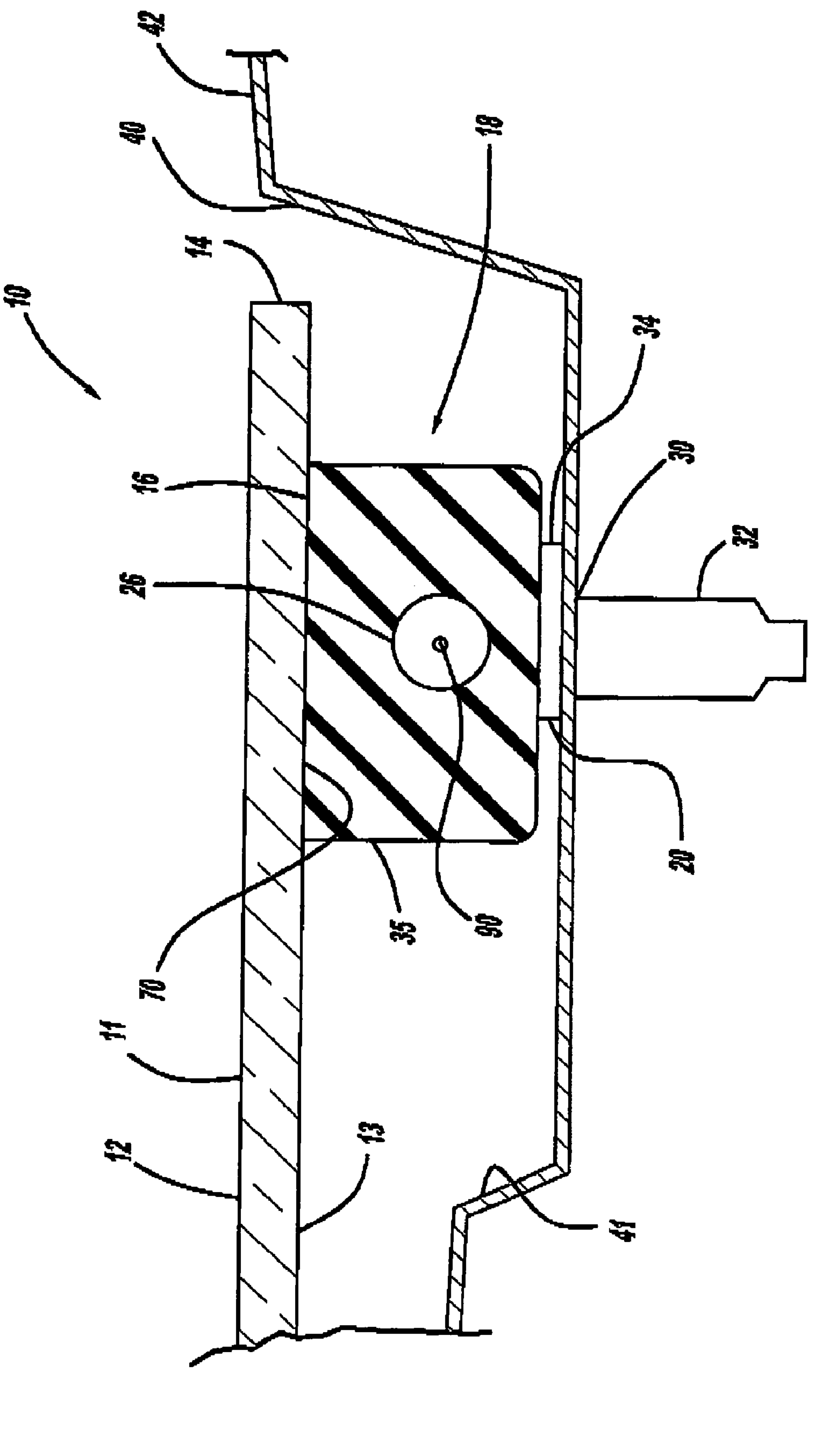
FIG. 4 is a partial cross-sectional view, partially broken away, of the window assembly of FIGS. 1–2, taken along line 4—4 in FIG. 2, shown in a closed position.
Figure 5:
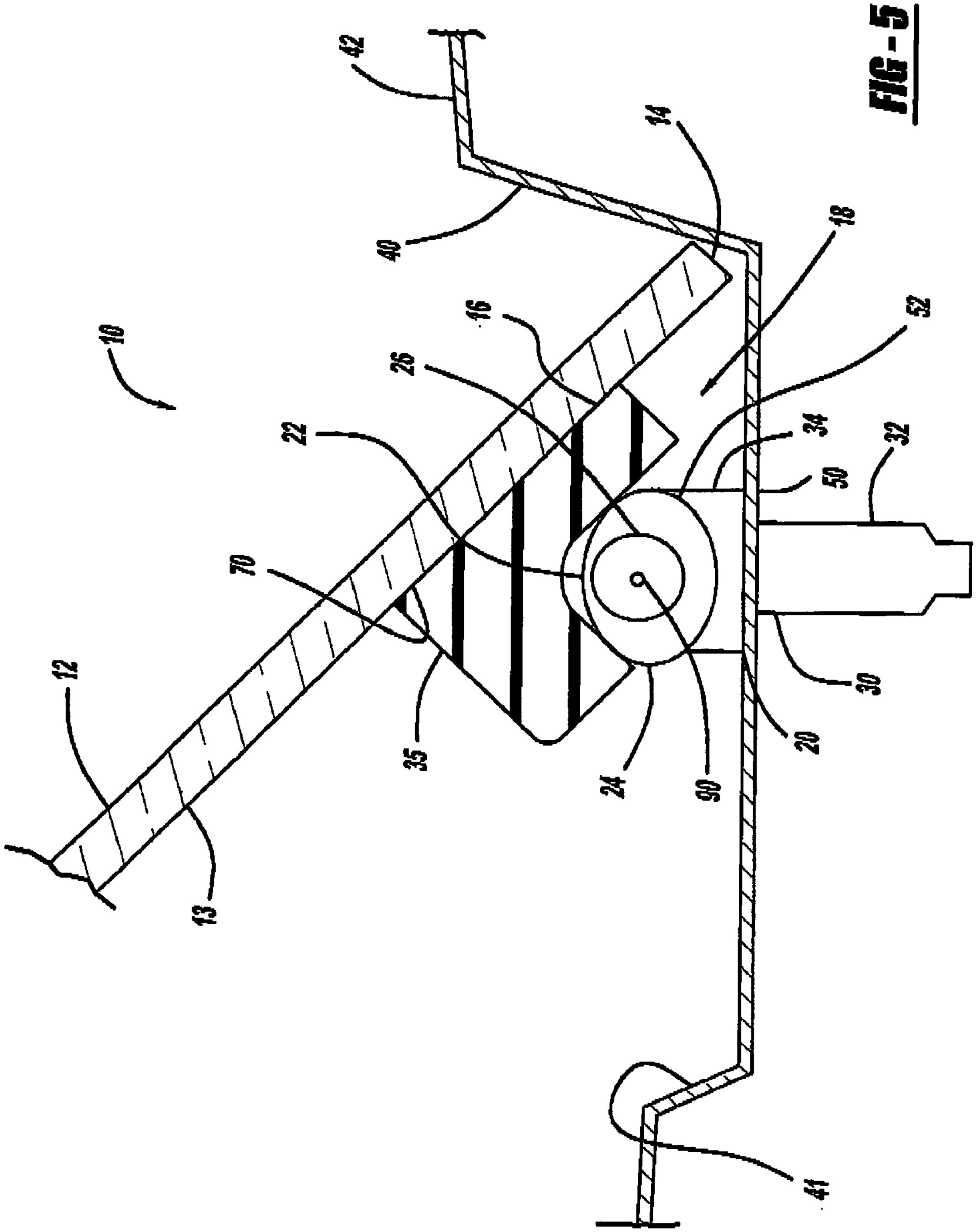
FIG. 5 is a partial cross-sectional view corresponding to FIG. 3, shown in an open or articulated position.
Figure 6:
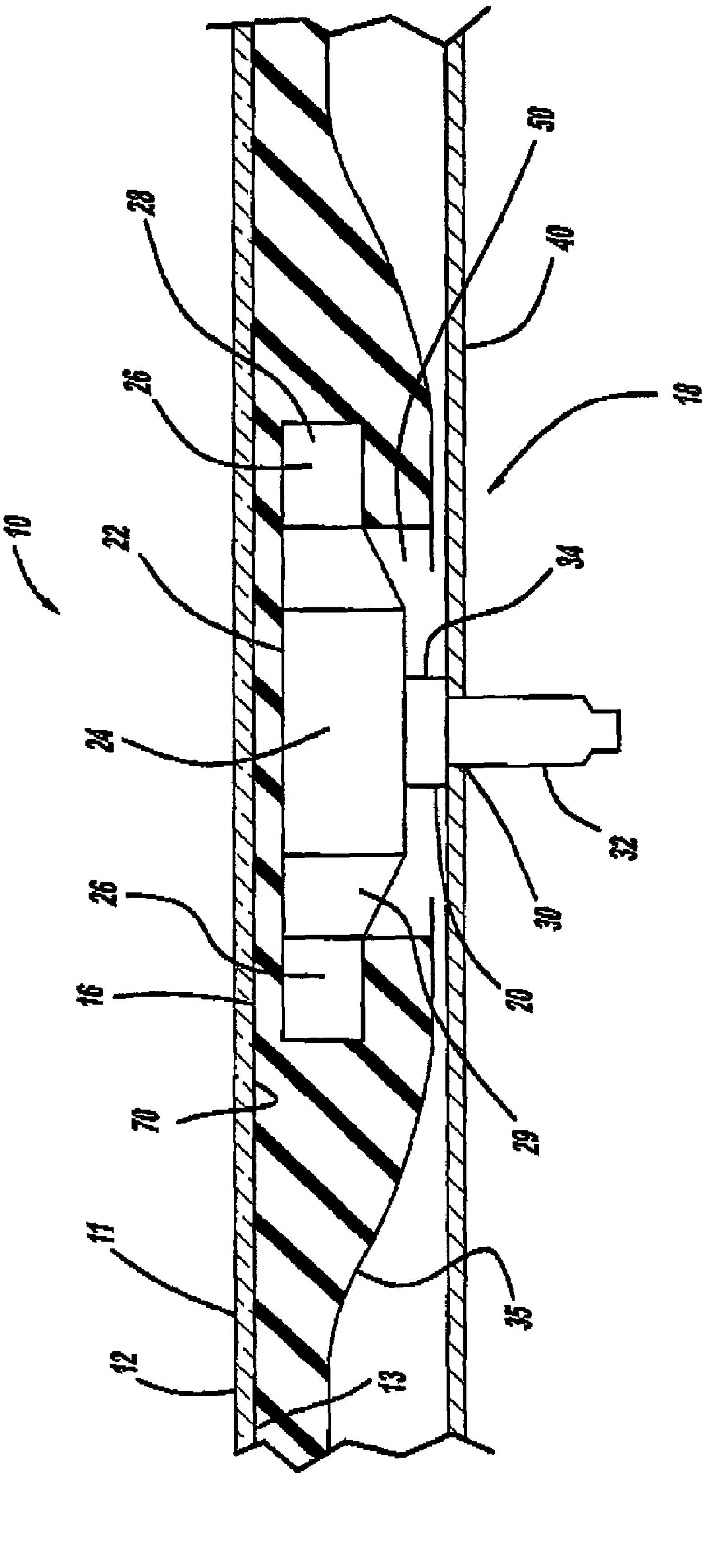
FIG. 6 is a cross sectional view of the hinge mount of the window assembly taken along line 6—6 in FIG. 2.
Figure 7:
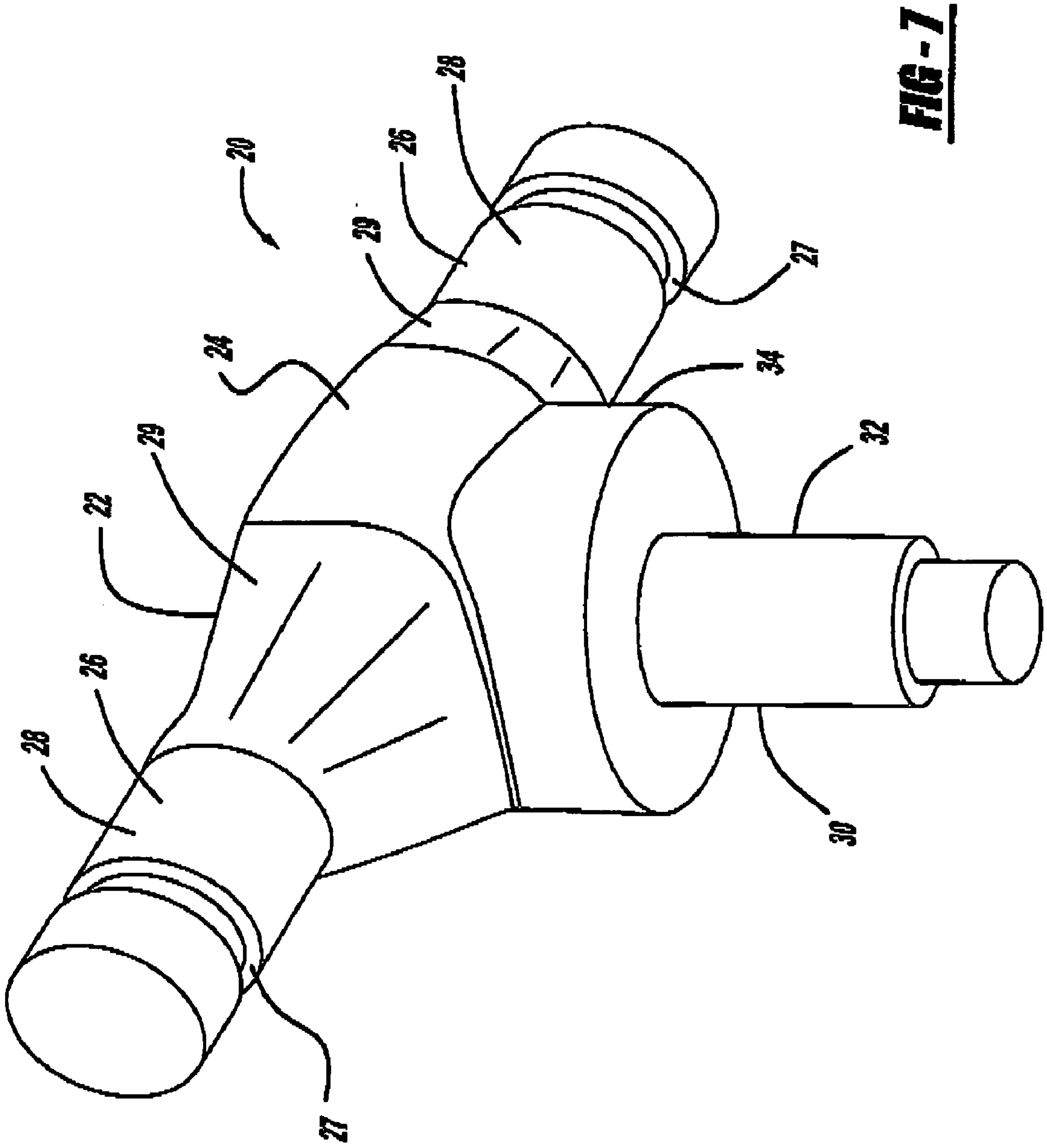
FIG. 7 is a perspective view of the stationary member of FIGS. 1–2.

Referring now to the drawings, FIGS. 1 and 2 show an articulating window assembly 10 in a motor vehicle body panel 40 pivotable between a closed position as shown and an open position, shown in FIG. 5. As seen in FIGS. 1–6, window assembly 10 has a windowpane 11 with an outer surface 12, an inner surface 13, and a peripheral edge 14. An opaque frit 15 is positioned around the peripheral edge, concealing attachment mechanisms such as hinge 18 and a latch 58 from exterior view. Where the windowpane 11 is made of glass, the frit is commonly a ceramic frit. It should be understood that reference throughout to the inner surface 13 of the windowpane 11 may mean with or without frit, primer, etc., as further described below. Window assembly 10 is located in a recess defined by peripheral ledge 41 of body panel 40 surrounding and defining an opening. In certain embodiments, outer surface 12 of windowpane 11 is positioned substantially flush with an exterior surface 42 of body panel 40. Optionally, a conventional seal assembly, not shown, may be positioned around the window assembly to prevent water, dirt and the like from entering the motor vehicle through the opening when the window assembly 10 is in the closed position. Suitable mounting positions and seal assemblies will be readily apparent to those of skill in the art, given this disclosure.

Articulated window assembly 10 is attached to body panel 40 by hinge 18. Hinge 18 includes stationary member 20 and polymeric member 35. As shown in FIGS. 3–11, stationary member 20 includes pivot element 22 and mounting element 30. Pivot element 22 is comprised of a central portion 24 and cylindrical extensions 26 extending at opposite sides of the central portion 24 to define a pivot axis 90. Each cylindrical extension 26 has a bearing surface 28, further described below. Central portion 24 has tapered sections 29 that taper from the larger cross-section of the central portion 24 to the smaller cross-section of the cylindrical extensions 26. In other words, via tapered sections 29, the central portion 24 fairs into the cylindrical extensions 26. The larger cross-section of the central portion 24, taken normal to the pivot axis 90, advantageously adds mass to the stationary member and increases its strength and durability. Optionally, the central portion does not contain tapered sections, and instead transitions abruptly, by steps, or otherwise transitions into the cylindrical extensions. Other suitable configurations for the central portion and the cylindrical extensions will be apparent to those skilled in the art, given this disclosure.

Mounting element 30, as shown in FIGS. 3–11, comprises a cylindrical stud 32 extending from the central portion 24 substantially perpendicularly of the pivot axis 90. The cylindrical stud 32 extends through body panel 40 for attachment of the stationary member 20, and through it the window assembly 10, to the body panel 40. The cylindrical stud may optionally include a threaded portion, to be screwed into the body panel or to be attached thereto with the assistance of a nut. In certain embodiments, the mounting section comprises a smooth surface or plate, optionally with other suitable mounting structure, e.g., threaded or unthreaded holes. The mounting section may be attached by means of a rivet or rivets, adhesive, welds, and the like, and may be attached by any combination of these. The mounting element further comprises an optional mounting collar 34, which is designed to sit flush against the body panel when installed to permit rapid installation of the window assembly such that the windowpane is located at a desired height above the body panel. The mounting collar in certain embodiments further assists in holding the stationary member rigidly in place. Other suitable mounting means will be readily apparent to those skilled in the art, given this disclosure.

In certain embodiments, the polymeric member is comprised of polymer, plastic, thermoplastic elastomer (TPE) or plastomer. The polymer may be comprised of thermoplastic polymer, thermosetting polymer or a mixture of both. Suitable thermoplastic polymers include, for example, acrylics, acrylonitrile-butadiene-styrenes (ABS), high-impact polystyrene (PS, HIPS), ionomers, polyamides, polyamide-imides, polyarylates (PAR), polyaryletherketone (PAEK, PEK, PEEK, PEKK), polybutylene terephthalates (PBT), polyether sulfones (PES, PESV), polyethylenes, polyvinyl chloride (PVC), thermoplastic polyimides (TPI), styrene-acrylonitriles (SAN, OSA, ASA), and styrene-maleic anhydride (SMA). Suitable thermosetting polymers include, for example, allyls (DAP, DAIP), alkyd, amino's, cyanates, epoxy, phenolics, polyurethanes (PUR), and urethane hybrids. Combinations of any of the above may also be employed. Other suitable polymeric member materials will be readily apparent to those skilled in the art, given the benefit of this disclosure.

Optionally, reinforcing materials, such as, for example, fibers may be added to increase the strength of the polymeric member, for example, to increase load-carrying capacity. The reinforcing materials may be embedded into the polymeric material, typically spaced away from the windowpane. Other suitable reinforcing materials will be readily apparent to those skilled in the art, given this disclosure.

In certain embodiments, polymeric member 35 is composed of a reaction injection molded polyurethane (RIM material), formed by injection molding a polyol and an isocyanate together into a mold cavity of a heated mold. The shape of the mold cavity, in combination with the action of an optional canister, described below, that fits around the hinge to restrict or exclude the polymeric material from settling over certain areas, determines the shape or configuration as well as the location relative to the remaining hinge structures and to the windowpane of polymeric member 35. The polyurethane system may in the alternative comprise structural reaction injection molding (SRIM) or composite reaction injection molding (RRIM). Other suitable materials will be apparent to those skilled in the art given the benefit of this disclosure.

Polymeric member 35 surrounds at least a portion of the cylindrical extensions 26 to cooperatively form a pivotable attachment. In certain embodiments, polymeric member surrounds or encases the full circumference of the cylindrical extensions, but complete encasement is not required. Rather, the cylindrical extensions must be surrounded sufficiently that the polymeric member cannot be removed from the extensions. For example, where more than 50% of the circumference of the cylindrical extension is encased, such as 60% or more, e.g. 75% or more, including embodiments in which as much as 100% of the cylindrical extension is surrounded, the polymeric member will be retained against the cylindrical extensions. The above percentages refer to the percent of the circumference of the cylindrical extension surrounded, and those of skill in the art will of course realize that these numbers do not refer to the percent coverage in terms of the longitudinal direction of the extensions, that is to say, in the direction of the hinge axis. The polymeric member is not bonded or adhered to the cylindrical extensions, and instead is retained by the stationary member mechanically, that is, by surrounding the cylindrical extensions, the solid polymeric member body retains itself against the extensions. In this fashion, the polymeric member is free to rotate about the cylindrical extensions. In certain embodiments, such as those illustrated in FIGS. 7, 9A and 10, cylindrical extensions 26 have annular notches 27 which can be filled by polymeric material of polymer member 35 to further aid in the mechanical grip of the extensions by the polymeric member. It will be recognized that the surfaces of the annular notches would in certain embodiments comprise a portion of the bearing surfaces of the cylindrical extensions. The cylindrical extensions and optional annular notches are optionally coated with a layer of barrier coat on bearing surfaces 28 such as Monocoat® 1021 w or Monocoat® 472 w manufactured by Chem-Trend Inc. of Howell, Mich., to prevent polymer material of the polymeric member from adhering to the bearing surfaces of cylindrical extensions. In certain embodiments, the central portion and tapered sections are likewise coated to prevent polymeric material from adhering to their surfaces. This assures that the polymeric member 35 will remain free to rotate about the cylindrical extensions 26 when the hinge is assembled. Optionally, a sleeve, e.g. a polytetrafluoroethylene or Teflon® sleeve, may be adjacent to or surround the bearing surfaces to aid in pivoting of the hinge. Other suitable means for permitting the polymeric member to rotate about the cylindrical extensions will be readily apparent to those skilled in the art, given this disclosure.

In certain embodiments, for example those illustrated in FIGS. 3–6 and 11, the polymeric member defines a cavity, rabbet or cut-out 50 along the second side 52 of the stationary member 20, typically adjacent to the central portion 24 of the stationary member 20. The second side 52 is the side of the stationary member in which the gap, or distance, between the inner surface of the windowpane and the body panel to which the window assembly is attached decreases as the window is opened. As such, were there polymeric material located at the position of the cavity, the material would be forced to compress against the stationary member and optionally against the body panel as the window was opened, leading to increased stresses on the stationary member, the polymeric member, the body panel, the windowpane and the remaining hinge elements, limiting the maximum amount that the window could be opened, and increasing the force required to open the window. The cavity occupies the space in which such compression would otherwise occur, thus alleviating stresses on the stationary member, the polymeric member, the body panel, the windowpane and the remaining hinge elements. The cavity may be any shape or size required to achieve such a result. Suitable cavity configurations will be readily apparent to those skilled in the art, given the benefit of this disclosure.

Polymeric member 35 secures the stationary member 20 to windowpane 11 by bonding to a bonding portion 16 of the windowpane 11, which is typically located along the inner surface 13, generally at or near a peripheral edge 14 of the windowpane 11. In this fashion, hinge 18 permits windowpane 11 to articulate or pivot with respect to the motor vehicle 40. In certain embodiments, for example certain of those utilizing a polyurethane system as the polymeric member material, the material is injected directly against the windowpane. Optionally, a coating layer or layers of primer, adhesive promoter, adhesive or the like is applied to inner surface 13 of windowpane 11 prior to application of the polymeric material to windowpane 11. In other embodiments, a frit layer, paint layer or the like is located between the windowpane and the polymeric member, while in yet other embodiments, a combination of two or more layers comprising frit, primer, and/or adhesive are employed. It will be understood that the polymeric member is bonded to the inner surface of the windowpane where the polymeric member is bonded to a portion of the inner surface of the windowpane or is injected directly against the windowpane, where one or more layers of frit, primer, adhesive, paint or the like, or combinations of such, is interposed between the polymeric member and the inner surface of the windowpane. The primer may be a silane primer, such as, for example, when the polymeric member is composed of RIM material and windowpane 11 has a surface comprised of soda-lime-silica glass. Examples of silane primers include Chemlok® 144 and Chemlok® AP-134, manufactured by Lord Corporation of Erie, Pa. Without wishing to be bound by theory, it currently is believed that the primer contains silane groups that bond with hydroxyl groups of the surface of such a windowpane and bond with the isocyanates of the polyurethane, thereby forming an excellent bond between the windowpane and the RIM material. Other combinations of windowpane surface treatments and polymeric member materials will be apparent to those skilled in the art given the benefit of this disclosure.

Figure 10:
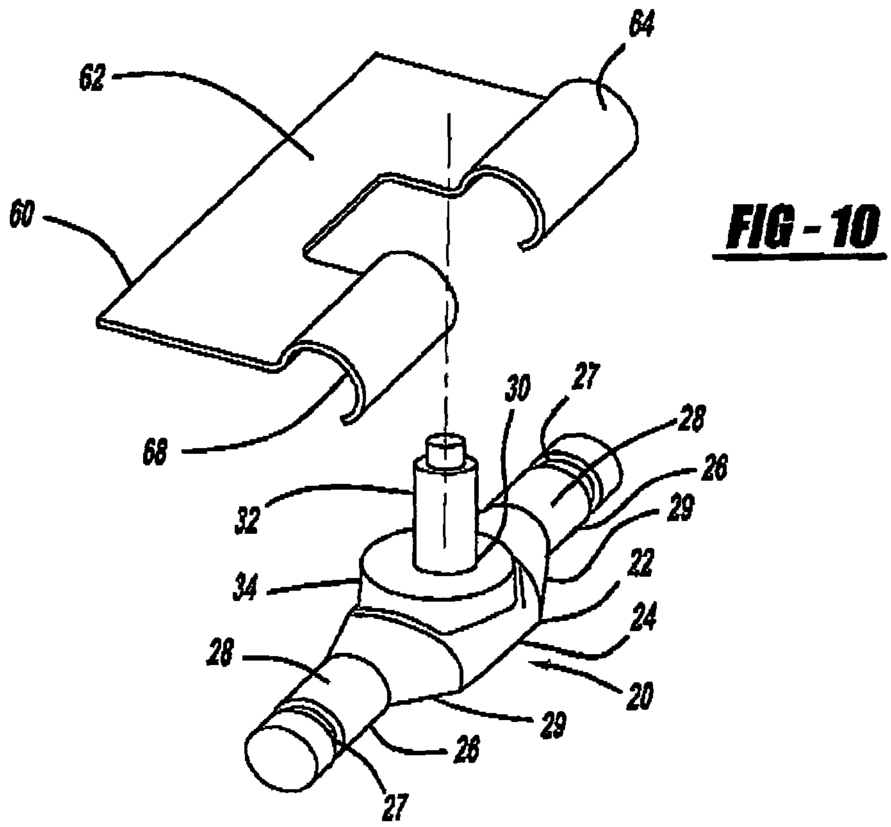
FIG. 10 is an exploded view of a stationary member and a retaining plate.
Figure 11:
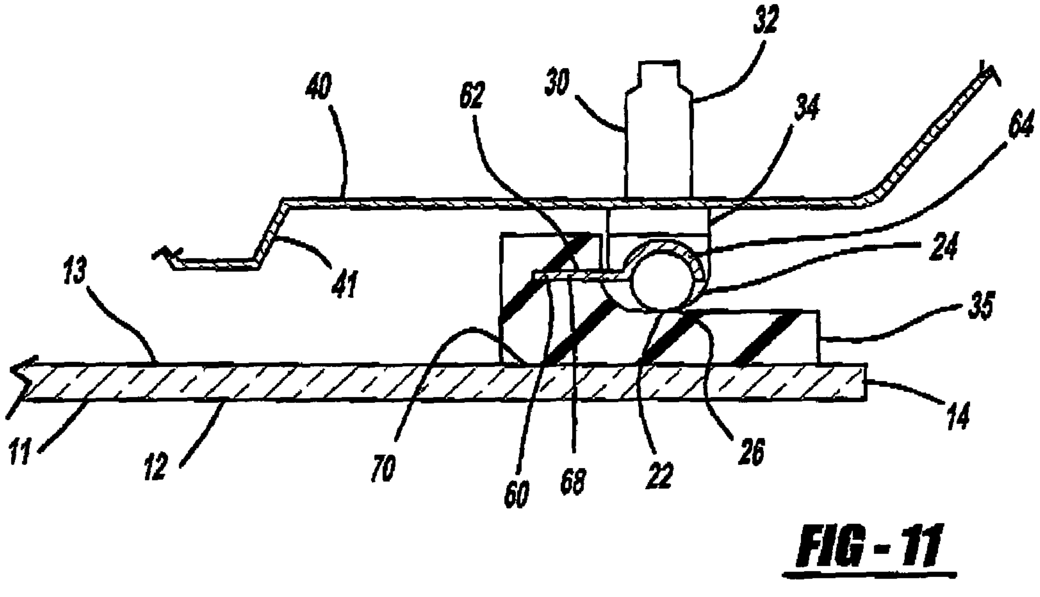
FIG. 11 is a partial cross-sectional view of an alternate hinge, shown attached to a body panel of a motor vehicle, the hinge having the retaining plate of FIG. 10.

Optionally, as shown in FIGS. 10 and 11, base or reinforcement plate 60 is used to aid in the prevention of the polymeric member working free of the stationary member. Reinforcement plate 60 may be comprised of a material of greater strength and/or stiffness than the polymeric member, such as, for example, aluminum or steel. In certain embodiments, reinforcement plate 60 includes a generally flat portion 62 embedded in polymeric member 35 and a pair of arcuate portions 64 adjacent cylindrical extensions 26. Optionally, the flat portion may include curved portions and non-planar portions, for example ridges, to increase the surface area of the flat portion. Both sides of flat portion 62 may be optionally coated with a suitable primer or adhesive to increase bonding to polymer 35. In certain embodiments, the inner surface area 68 of arcuate portion 64 is coated with a layer of barrier coat to prevent polymeric material 35 from adhering to arcuate portion 64. In other embodiments, one or more sleeves are interposed between the reinforcement plates and the cylindrical extensions to further aid in allowing rotation of the polymeric member relative to the stationary member. Arcuate portion 64 operatively engages and cradles cylindrical extensions 26 to aid the polymeric member in retaining itself and thereby retaining the window against the stationary member of the hinge. Optionally, other structural reinforcing members may be employed, either with or in place of the base plate. The structural reinforcing members may be imbedded into polymeric material 35, and are optionally spaced away from reinforcement plate 60. Other suitable configurations for reinforcement plates and other structural reinforcing members will be readily apparent to those skilled in the art, given the benefit of this disclosure.

Stationary member 20 may be made of any suitable material, including metals such as, for example, aluminum, steel, zinc, magnesium and the like. Alternatively, stationary member 20 may be made of a suitable polymer, such as, for example, thermoplastic or thermoset plastic. Combinations of the above may also be employed. Stationary member 20 may be formed using any suitable process, including, e.g., a cast process, injection process, die casting process, forging process and/or machining. In certain embodiments, the cylindrical extensions, central portion, and mounting element are each comprised of the same material, while in other embodiments, differing materials may be used for one or more different components of the stationary member. Part or all of the stationary member may be optionally electro plated to resist corrosion. Other suitable materials or combination of materials will be readily apparent to those skilled in the art, given the benefit of this disclosure.

Figure 9B:
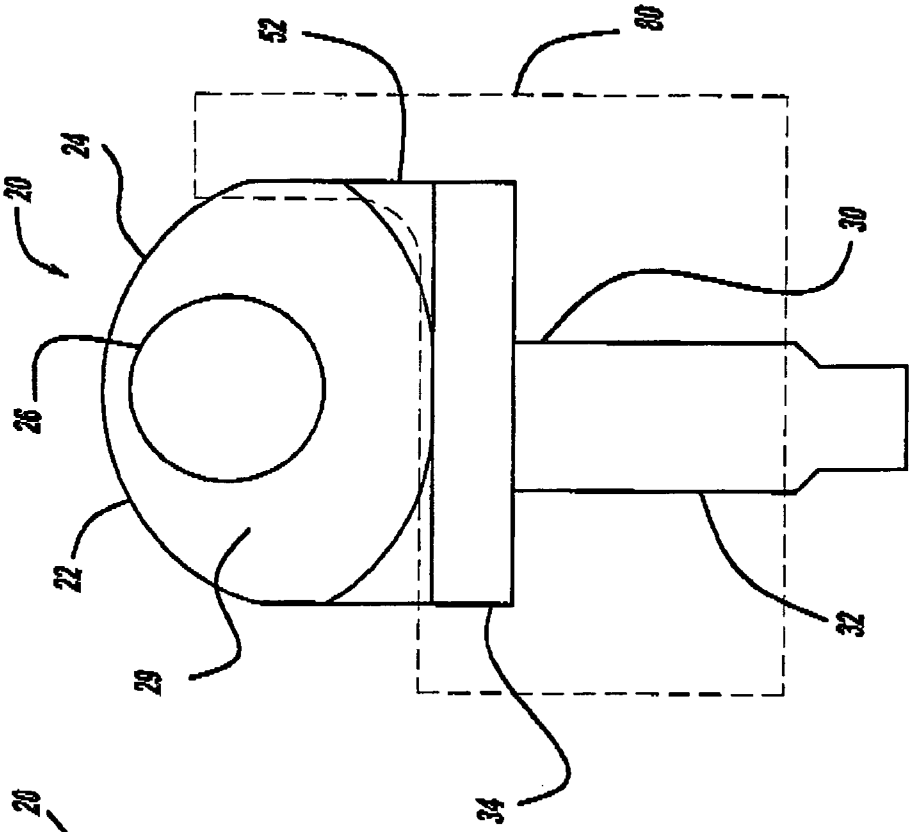
FIG. 9B is a side view of the stationary member FIG. 7 shown with the canister in place.
Figure 8:
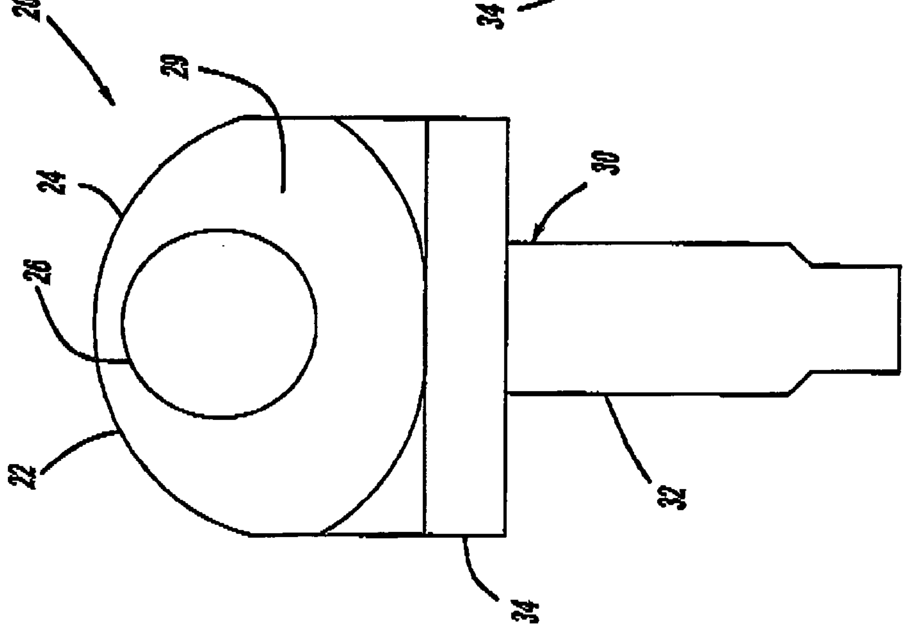
FIG. 8 is a side view of the stationary member of FIG. 7.
Figure 9A:
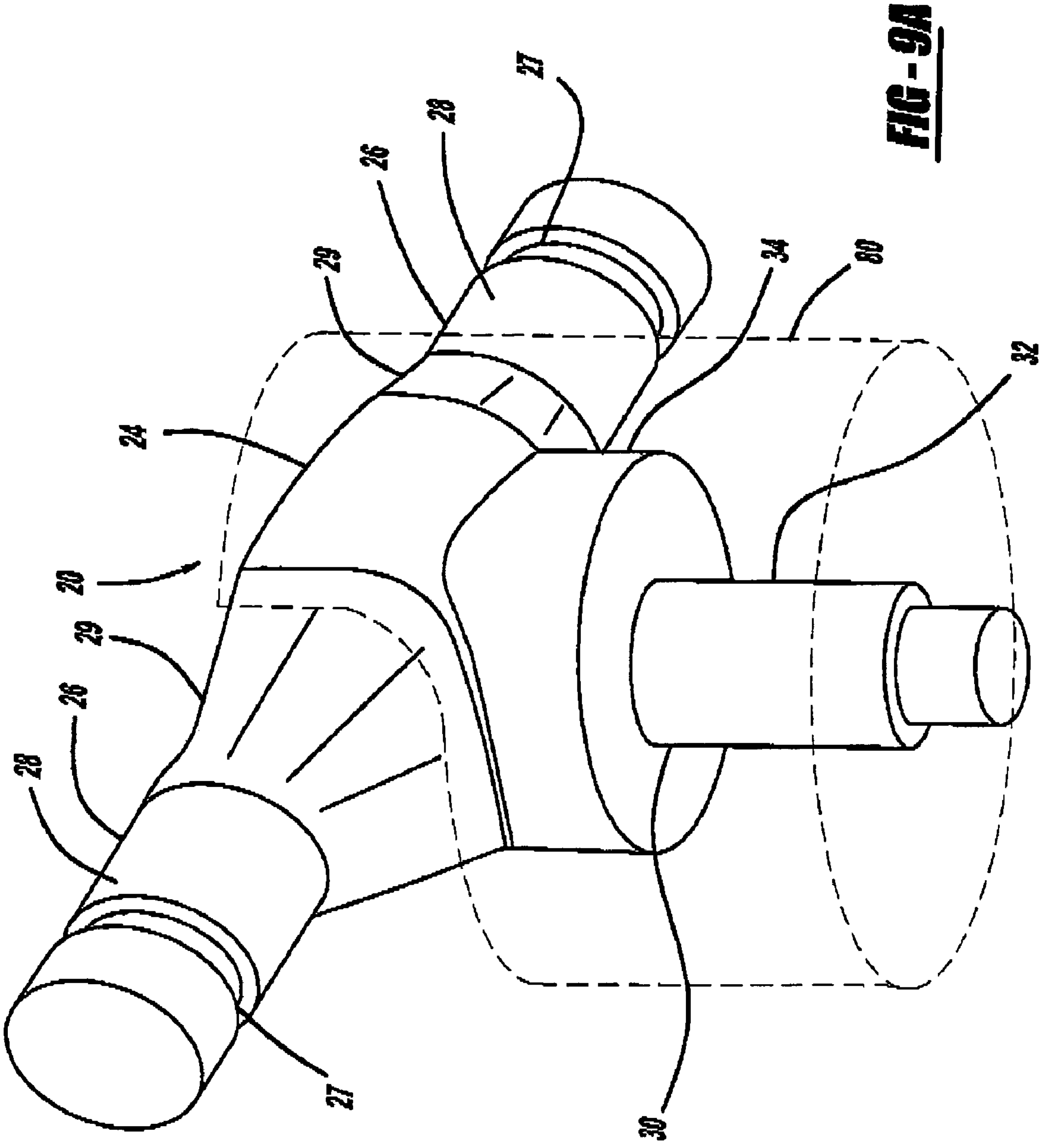
FIG. 9A is a perspective view of the stationary member FIG. 7 shown with the canister in place.

In certain embodiments, manufacturing of the articulating window assembly is accomplished by inspecting, preparing and cleaning a windowpane. Then primer 70 is applied to inner surface 13 of the windowpane 11, and the windowpane is placed into the mold. Optionally, canister 80, seen in FIGS. 9A and 9B, is placed around the stationary member to further exclude polymeric material from selected areas of the stationary member. Canister 80 may be comprised of two or more pieces that snap to fit around the stationary member. The canister is used in certain embodiments to exclude polymeric material from the compression side of the stationary member to form the cavity referred to above. The hinge 18, along with the canister 80, is inserted into a mold cavity of a mold. Optionally, the canister may comprise sections of the mold plates that fit together upon closing the mold, in which case the hinge is placed into the mold and the canister closes about it when the mold is closed. Upon closing the mold, curable polymeric material is injected into the mold cavity, at least partially surrounding the cylindrical extensions 26 and the optional base plate 60 to form the polymeric member 35. The polymeric member 35 is bonded to inner surface 13 of windowpane 11. The windowpane 11, with hinge 18 bonded thereto, can then be removed from the mold cavity and installed in a vehicle. Advantageously, the polymeric member as removed from the hinge requires less or no trimming, deburring or drilling, reducing the manpower, time, cost and manufacturing floor space required.

Where a polymeric material is chosen that is not injection moldable, this method is suitably altered to accommodate such material. Further, the stationary member can be encased by the polymeric member and then removed from the mold for attachment to the windowpane at a later time. Other suitable methods for manufacturing the articulating window assemblies disclosed herein will be readily apparent to those of skill in the art, given the benefit of this disclosure.

In operation, when an operator or passenger in the motor vehicle wishes to open window assembly 10, latch 58 is released, thereby permitting windowpane 11 to articulate outboard of the motor vehicle about hinge 18. Hinge 18 permits windowpane 11 to pivot about pivot axis 90 from a closed position to an open position and back.

From the foregoing disclosure and detailed description of certain preferred embodiments, it will be apparent that various modifications, additions and other alternative embodiments are possible without departing from the true scope and spirit of the invention. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled. While the invention has been described with respect to specific examples including presently preferred modes of carrying out the invention, those skilled in the art will appreciate that there are numerous variations and permutations of the above described systems and techniques that fall within the spirit and scope of the invention as set forth in the appended claims.

The invention as claimed is:

1. An articulating window assembly adapted for use in a window opening of a vehicle body, the assembly comprising, in combination:

- a windowpane having an inner surface, an outer surface and a peripheral edge, the inner surface having an attachment portion; and
- a hinge having a window opening side and a second side which is opposite the window opening side, the hinge comprising:
  - a stationary member comprising a pivot element extending along a pivot axis and a mounting element extending at an angle to the pivot axis, the pivot element comprising:
    - a central portion from which the mounting portion extends, and
    - a cylindrical extension extending along the pivot axis from the central portion, the central portion having a larger cross section, taken normal to the pivot axis, than the cylindrical extension; and
  - a polymeric member surrounding at least a portion of the cylindrical extension and attached to the attachment portion of the windowpane, the polymeric member adapted to rotate about the pivot axis.

2. The articulating window assembly of claim 1, wherein the pivot element further comprises two cylindrical extensions extending along the pivot axis from opposite sides of the central portion and wherein the polymeric member surrounds at least a portion of both cylindrical extensions.

3. The articulating window assembly of claim 1, wherein a top of the central portion is level with a top of the cylindrical extension.

4. The articulating window assembly of claim 1, further comprising a mounting collar located around the mounting element and adjacent the central portion.

5. The articulating window assembly of claim 1, wherein the central portion fairs into the cylindrical extension.

6. The articulating window assembly of claim 1, wherein the polymeric member has a cavity at the second side of the central portion.

7. The articulating window assembly of claim 1 wherein the polymeric member comprises at least one of an elastomer, a thermoplastic, a thermoset plastic, and mixtures thereof.

8. The articulating window assembly of claim 1 wherein the polymeric member comprises at least one of polyurethane, polyvinyl chloride, thermoplastic elastomers, acrylonitrile butadiene styrene, polymethyl methacrylate, polyamide or mixtures thereof.

9. The articulating window assembly of claim 1, wherein the hinge further comprises a reinforcement plate having at least one arcuate portion adjacent to the cylindrical extension and adapted to cradle the cylindrical extension therein and a second portion which is embedded in the polymeric member.

10. The articulating window assembly of claim 1, wherein the mounting portion comprises means for mounting the hinge to a vehicle.

11. The articulating window assembly of claim 10, wherein the means for mounting the hinge to the vehicle comprises a threaded cylindrical stud.

12. The articulating window assembly of claim 1, wherein the attachment portion of the inner surface of the windowpane comprises at least one of frit, primer or both.

13. The articulating window assembly of claim 1, wherein the hinge does not contact the outer surface or the peripheral edge of the windowpane.

14. The articulating window assembly of claim 1, wherein the cylindrical extension comprises one or more annular slots.

15. An articulating window assembly adapted for use in a window opening of a vehicle body, the assembly comprising, in combination:

- a windowpane having an inner surface, an outer surface and a peripheral edge, the inner surface having an attachment portion;
- a hinge having a window opening side and a second side which is opposite the window opening side, the hinge comprising:
  - a stationary member comprising a pivot element extending along a pivot axis and a mounting element extending at an angle to the pivot axis, the pivot element comprising:
    - a central portion from which the mounting portion extends, and
    - a cylindrical extension extending along the pivot axis from the central portion; and
- a polymeric member attached to the attachment section of the windowpane and surrounding at least a portion of the cylindrical extension so as to permit the windowpane to articulate about the pivot axis, wherein the polymeric member has a cavity at the second side of the central portion.

16. The articulating window assembly of claim 15, wherein the stationary member further comprises two cylindrical extensions that share a longitudinal axis and wherein the polymeric member surrounds at least a portion of both cylindrical extensions.

17. The articulating window assembly of claim 15, wherein the hinge further comprises a reinforcement plate having at least one arcuate portion adjacent to the cylindrical extension and adapted to cradle the cylindrical extension therein and a second portion which is embedded in the polymeric member.

18. The articulating window assembly of claim 17, further including one or more sleeves interposed between the reinforcement plate and the cylindrical extension.

19. The articulating window assembly of claim 15, wherein the hinge does not contact the outer surface or the peripheral edge of the windowpane.

20. A vehicle comprising an articulating window assembly, the window assembly comprising, in combination:

a windowpane having an inner surface, an outer surface and a peripheral edge, the inner surface having an attachment portion; and a hinge having a window opening side and a second side which is opposite the window opening side, the hinge comprising:

a stationary member comprising a pivot element extending along a pivot axis and a mounting element extending at an angle to the pivot axis, the pivot element comprising a central portion from which the mounting portion extends, and a cylindrical extension extending along the pivot axis from the central portion, the central portion having a larger cross section, taken normal to the pivot axis, than the cylindrical extension; and a polymeric member surrounding at least a portion of the cylindrical extension and attached to the attachment portion of the windowpane, the polymeric member adapted to rotate about the pivot axis.

21. The vehicle of claim 19, wherein the polymeric member has a cavity at the second side of the central portion.

22. The vehicle of claim 20, wherein the hinge does not contact the outer surface or the peripheral edge of the windowpane.

* * * * *